United States Patent
Doran et al.

(10) Patent No.: US 6,741,873 B1
(45) Date of Patent: May 25, 2004

(54) BACKGROUND NOISE ADAPTABLE SPEAKER PHONE FOR USE IN A MOBILE COMMUNICATION DEVICE

(75) Inventors: Patrick Doran, Pembroke Pines, FL (US); Richard B. Nicholls, Banks, OR (US); Pratik Desai, Boca Raton, FL (US); Sheetal Shah, Miami, FL (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/610,023

(22) Filed: Jul. 5, 2000

(51) Int. Cl.[7] ................................................. H04Q 7/20
(52) U.S. Cl. .................................. 455/569.1; 455/63.1
(58) Field of Search ........................... 455/63, 501, 65, 455/67.3, 69, 78, 550, 569, 570, 99, 345, 200.1, 212, 213, 214, 218, 220–222, 226.3; 704/205, 208, 211, 215, 214, 226, 233, 270; 379/406.01, 406.04, 406.07, 392.01, 88.01

(56) References Cited

U.S. PATENT DOCUMENTS

| | | | | |
|---|---|---|---|---|
| 4,811,404 A | * | 3/1989 | Vilmur et al. | 381/94.3 |
| 5,276,765 A | * | 1/1994 | Freeman et al. | 704/233 |
| 5,396,550 A | * | 3/1995 | Kim | 379/390.03 |
| 5,398,281 A | * | 3/1995 | Kurokawa et al. | 379/406.08 |
| 5,819,218 A | * | 10/1998 | Hayata et al. | 704/233 |
| 5,937,375 A | * | 8/1999 | Nakamura | 704/215 |
| 5,963,901 A | * | 10/1999 | Vahatalo et al. | 704/233 |
| 6,023,674 A | * | 2/2000 | Mekuria | 704/233 |
| 6,223,154 B1 | * | 4/2001 | Nicholls et al. | 704/233 |
| 6,453,041 B1 | * | 9/2002 | Eryilmaz | 379/392.01 |
| 2002/0057791 A1 | * | 5/2002 | Piket et al. | 379/417 |

* cited by examiner

Primary Examiner—Jean Gelin
(74) Attorney, Agent, or Firm—Scott M. Garrett

(57) ABSTRACT

A mobile communication device (100) determines a background noise level at a microphone (104). If, after determining the noise floor, the input signal exceeds a threshold, the mobile communication device transmits the input signal. The threshold is established such that if it is exceeded, it is likely that voice energy is being received at the microphone, and the threshold, in a first embodiment, is increased as the background noise level increases. In a second embodiment the threshold is determined as the difference between the input signal and the background noise level. As background noise increases, the threshold actually decreases.

4 Claims, 4 Drawing Sheets

BACKGROUND NOISE ADAPTABLE SPEAKER PHONE FOR USE IN A MOBILE COMMUNICATION DEVICE

TECHNICAL FIELD

This invention relates in general to mobile communication devices, and more particularly to mobile communication devices capable of operating in a speakerphone mode.

BACKGROUND OF THE INVENTION

Mobile communication devices, such as cellular telephones, have gained widespread use in virtually all metropolitan areas of the world. As such, manufacturers of these devices have sought to augment their usefulness by including a wide variety of features. One feature that has proven elusive is a speakerphone mode of operation. Speakerphone operation combines a relatively high power speaker and a high gain microphone with control circuitry and software so that the user can speak and hear at a distance from the speakerphone device while talking with a remote party telephonically. This is useful because the user does not have to hold the phone to the user's ear, leaving the user's hands free for other tasks, and it also allows others to hear and join in the conversation. One main use of speakerphones is conference calls, where several participants join in the conversation at one or both ends of the call. Speakerphones are commonly used in indoor settings in conjunction with wired telephone sets, but the wide range of acoustic environments and the small size of mobile communication devices work against satisfactory speakerphone operation. What works well for a traditional speakerphone used in an office environment produces very undesirable performance in a mobile communication device because of the much wider range of acoustic environments the device may be used in, and the physical limitation of the device.

One main aspect of speakerphone operation is the arbitration between the speaker and the microphone. In order to avoid the high audio output from feeding back into the high gain microphone, the speakerphone mutes the microphone when the far end party is speaking, and mutes the speaker when the near end party is speaking. By muting the microphone, it is meant that the signal received at the microphone is not transmitted to the remote party. This avoids echo since the remote party would otherwise hear themselves as the audio from the speaker fed back to the microphone. Some manufacturers have implemented anti-echo measures with complex digital signal processing to remove the feedback, and permit full duplex communication in speakerphone operation. However, since cost is a significant consideration in mobile communication devices, this sort of complex operation is best avoided. Furthermore, the fact that mobile communication devices are much smaller than ordinary desktop telephone sets presents a nearly insurmountable problem with regards to active echo cancellation because the high gain microphone is physically located in close proximity to the speaker. This is especially true in designs where the device has separate speakers for low and high power audio, and the high output speaker is placed near the bottom of the device, away from the earpiece speaker. In such designs, the high output speaker is extremely close to the high gain microphone.

Typically, in controlling arbitration between the speaker and the microphone, the speakerphone controller "locks" either the speaker or the microphone when either the remote or the near party, respectively, is speaking. Thus, if the speakerphone is receiving audio or voice signals from the remote party, and the near party is not speaking, the speakerphone will play the audio signal over the speaker, and mute the microphone to avoid feedback to the remote party (echo). Likewise, if there is no audio signal being received, and the speakerphone detects that the near party is speaking, it mutes the speaker so that any audio signals received from the remote party will not be played. In detecting speech at the near end, typically, the speakerphone simply measures the input level at the microphone, or at the audio processing circuitry, and when the level exceeds a preselected threshold, the speakerphone controller declares or decides speech is present at the microphone. If the remote party is not already speaking, the controller mutes the speaker and begins processing the audio signal at the microphone and transmitting it to the remote party. The problem with this method in a mobile communication device is that the mobile communication device may be operated in a noisy environment, and the background noise may be strong enough to lock on the microphone path and the user will not hear the remote party because the speaker is muted while the background noise overrides the controller. Therefore there is a need for a better method of detecting speech at the mobile communication device to enhance performance in a variety of acoustic environments.

DETAILED DESCRIPTION OF A PREFERRED EMBODIMENT

Figure 1:
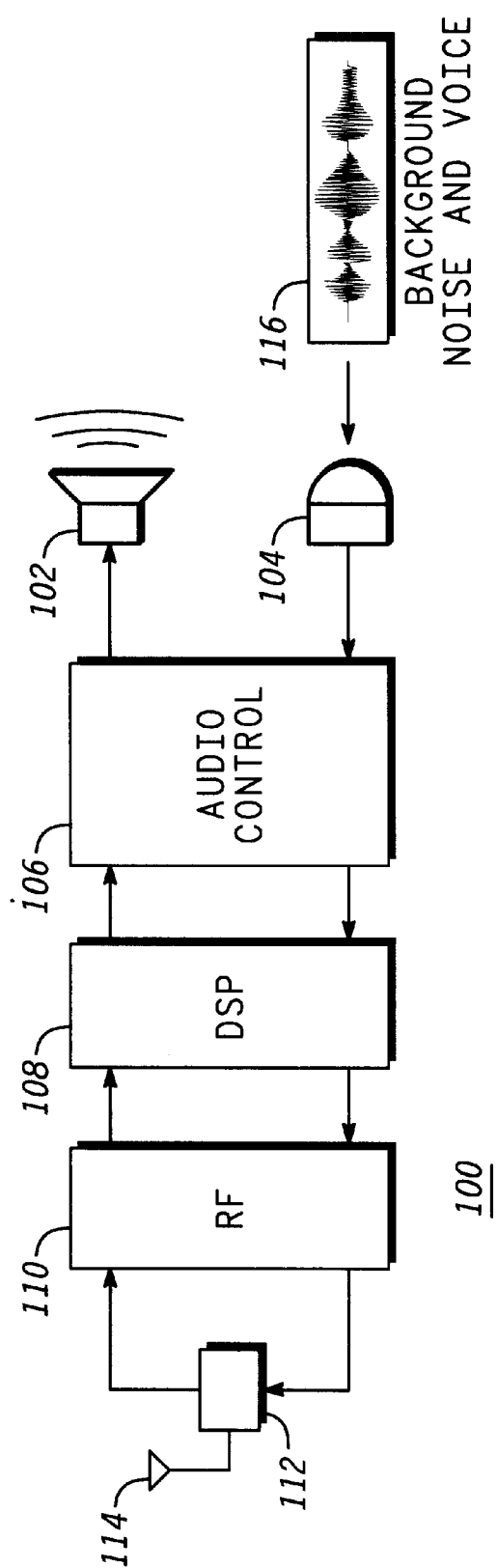
FIG. 1 shows a block diagram of a mobile communication device 100 capable of operating in a speakerphone mode.

While the specification concludes with claims defining the features of the invention that are regarded as novel, it is believed that the invention will be better understood from a consideration of the following description in conjunction with the drawing figures, in which like reference numerals are carried forward. A brief description of the prior art is also thought to be useful.

The invention avoids the problems of the prior art by changing the operating parameters with changes in the background noise level. In particular, there are two ways to do this. First, the invention proposes a first threshold based on the input signal level that increases as the background level increases. In this way the invention avoids the problem of background noise locking the microphone path on, and muting the speaker even when the user is not speaking. A second embodiment establishes a threshold based on the difference between the instantaneous input level and the background level, and reduces the amount of difference needed to declare speech present at the microphone with increasing background noise. By declare or declaring speech it is meant that the mobile communication device has determined that the input signal contains speech, and operates in accordance with the invention. The declaration may be made by setting a flag or calling a specific routine of the control software of the mobile communication device, for example.

Referring now to FIG. 1, there is shown a block diagram of a mobile communication device capable of operating in a speakerphone mode. The mobile communication device includes a speaker 102, microphone 104, audio processing circuitry 106, digital signal processing (DSP) circuitry 108, radio frequency circuitry 110, an antenna switch 112, and an antenna 114. The mobile communication device transmits and receives signals using the antenna 114. Signals that are received are processed along the top path through the RF, DSP and audio circuitry, while signals received at the microphone 104 are processed along the bottom path and are transmitted by the mobile communication device. A signal received at the antenna containing audio signals first passes through the antenna switch 112 to the RF circuitry 110 where it is demodulated. If the signal was sent as a digital signal, the RF circuit passes digital signals to the DSP 108. The DSP decodes the data and can determine if speech is present by any of the conventionally known techniques, such as, for example, measuring the energy of the received signal. If the received signal contains voice signal from the remote party, it is passed to the audio circuit in, for example pulse code modulation (PCM) samples. The audio circuit, or other control circuit, then determines whether or not to play the voice signal over the speaker 102.

At the near end, meaning the in the vicinity of the mobile communication device, the microphone receives both voice and background sounds 116. The audio circuit amplifies and digitizes the input signal to provide an input signal level to the DSP. The DSP performs the averaging and speech detection on the input signal. The background level may be computed by, for example, digitizing the input signal and framing the resulting samples, as is commonly performed in the art. Each frame is then processed by, for example, performing vector sum linear predictive coding operations at the DSP. The encoding process determines if the frame is voiced or unvoiced, meaning the particular frame does or does not contain speech, respectively. If the frame is unvoiced, the average energy of the frame is computed, and is used to determine an average background noise energy level. This may be done by, for example, averaging the last n unvoiced frames, or a staggered average may be used. A staggered average is computed by setting the staggered average value to the average background value is the average background value exceeds the present staggered average value, or computing a standard average if the average background value of the most recent unvoiced frame is less than the present staggered average value. In other words, if the background energy increases, the staggered average value is set to the value of the background energy value of the unvoiced frame, but if the background energy decreases, and averaging is performed between the present staggered average value and the background energy level. Other conventional techniques may be used as well. If the mobile communication device is not presently playing received audio over the speaker when speech is detected in the input signal, the DSP passes the input signal to the RF section to be modulated and transmitted to the remote party. At the same time, it also mutes the speaker so long as speech is present in the input signal.

Figure 2:
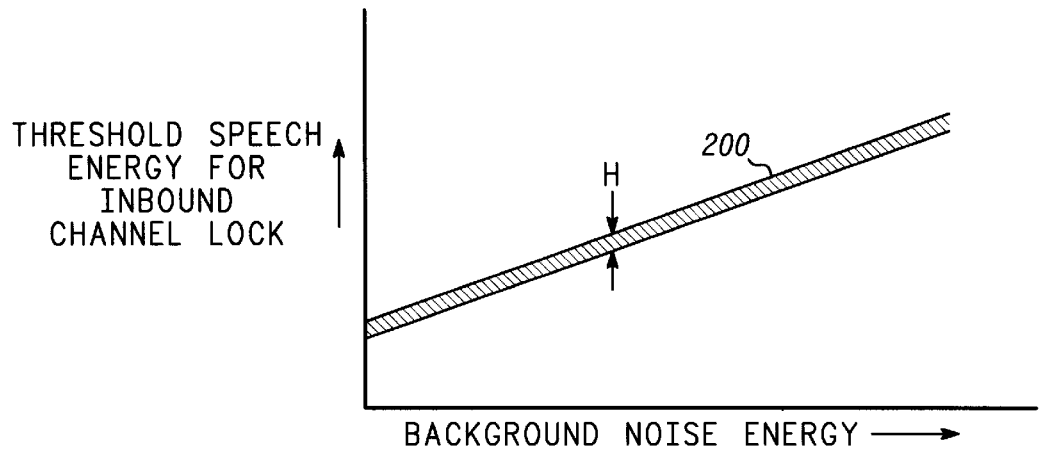
FIG. 2 shows a graph for selecting a threshold based on input signal level and that increases as the background noise level increases, in accordance with the invention.

The way speech is detected is performed in a variety of ways. One is illustrated in FIG. 2. FIG. 2 shows a graph for selecting a threshold based on input signal level and that increases as the background noise level increases, in accordance with the invention. The horizontal axis represents the background noise level or energy, while the vertical axis represents the threshold input signal level necessary for the DSP to declare speech is present in the input signal, and lock the inbound channel. The inbound channel refers to the signal the mobile communication device transmits to the remote party, while the outbound signal is the signal received from the remote party. The line 200 represents the energy level necessary in the input signal for a given background level to declare speech present. In a conventional speakerphone, this line is parallel to the horizontal axis. However, by increasing the threshold level with increasing background noise, the present invention avoids the problem of having the background level exceed the threshold and lock the inbound channel. The line 200 is shown as a thick line; this represents the contemplation that hysteresis (H) may be employed.

Figure 3:
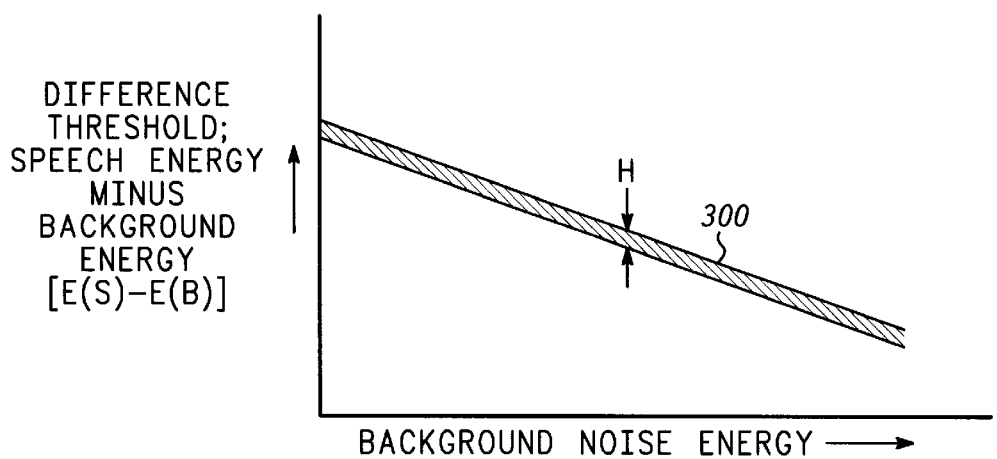
FIG. 3 shows a graph for selecting a threshold based on the difference between the input signal level and the background noise level and that decreases as the background noise level increases, in accordance with the invention.

Another method is shown in FIG. 3, which shows a graph for selecting a threshold based on the difference between the input signal level and the background noise level and that decreases as the background noise level increases, in accordance with the invention. The line 300 here represents the threshold being calculated by finding the difference between the present input signal level and the background noise floor. As the background noise level increases, a smaller difference between the input signal level and the background noise is needed to declare speech present in the input signal. In other words, as the average background noise increases, a smaller difference between the input signal level and the background noise level is used to declare speech present in the input signal. This enhances the performance in environments with high background noise because, as the background noise level increases, the speaker may not be able to proportionally increase their voice level. This could be because either the speaker is not capable of increasing their speech level, or because of limitations in the audio circuitry. As in FIG. 2, the threshold may be subject to hysteresis.

Figure 4:
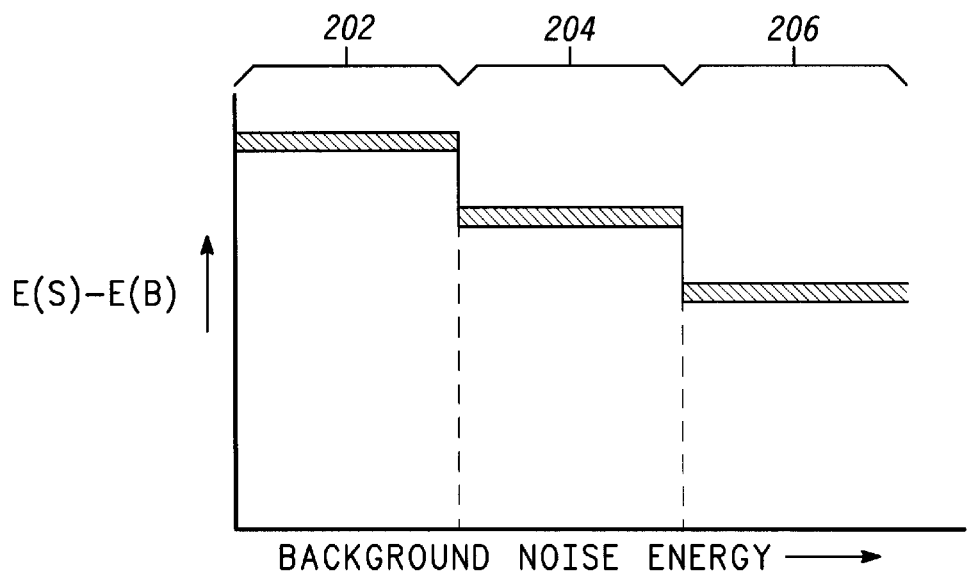
FIG. 4 shows how the threshold can be adjusted stepwise, in accordance with the invention.

FIG. 4 shows a similar implementation as in FIG. 3, except it also shows how the threshold can be adjusted step-wise, in accordance with the invention with one embodiment of the invention. Rather than having a continuously varying threshold level, range's are defined, such as ranges 202, 204, and 206. Within these ranges the threshold is constant, but decrease with respect to each other for increased background levels. Here, as in FIG. 3, the threshold is defined as the difference between the input level and the background level. These levels may be instantaneous levels, or average values, voltage or energy levels, as determined conventionally. It will be appreciated by those skilled in the art that the same sort of step-wise approach may be used in conjunction with the method of FIG. 2. Except in such a case, the steps will increase with increasing background level.

Figure 5:
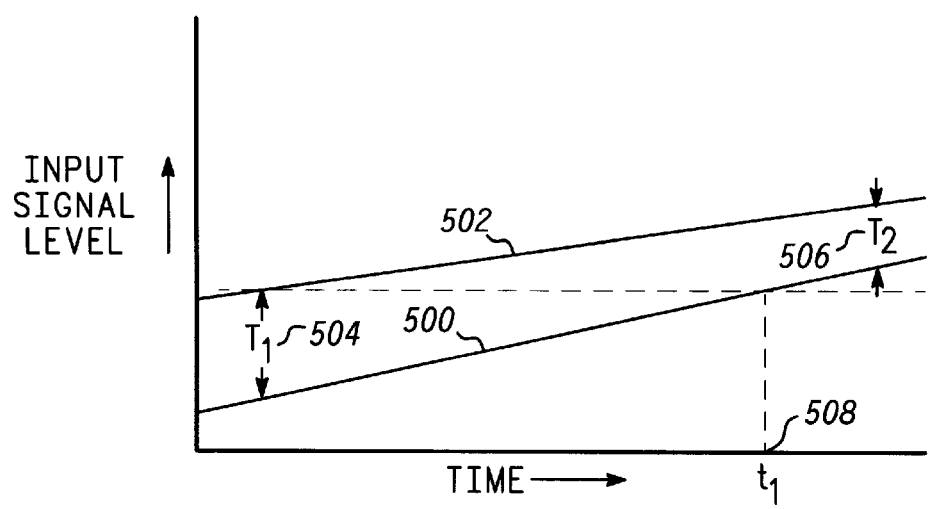
FIG. 5 shows a graph of increasing background noise level over time, and how the threshold relates, in accordance with the invention.

Finally, FIG. 5 integrates both approaches. FIG. 5 shows a graph of increasing background noise level over time, and how the threshold relates, in accordance with the invention. Here the horizontal axis is time, while the vertical axis is input signal level. The line bottom 500 represents a continuously increasing background noise level, for the purpose of illustration. The top line 502 represents the minimum input signal level at which speech will be declared. Notice that the top line increases, but not at the same rate as the bottom line, the background noise. Consequently, the difference threshold 504 $T_1$ near the lower end of the background noise range is larger than a second difference threshold 506 $T_2$ near the higher end of the background noise range. Note that had the threshold remained constant, the background noise would have exceeded the threshold at point 508 on the graph. Essentially, the slope of the threshold, the top line 502 is changes proportionally to the background noise level, but at a rate slight less than that of the background noise. So, for example, for every 3 dB increase in background noise level, the threshold increases 2.5 dB. The precise slope and threshold determination depend on the particular application.

Figure 6:
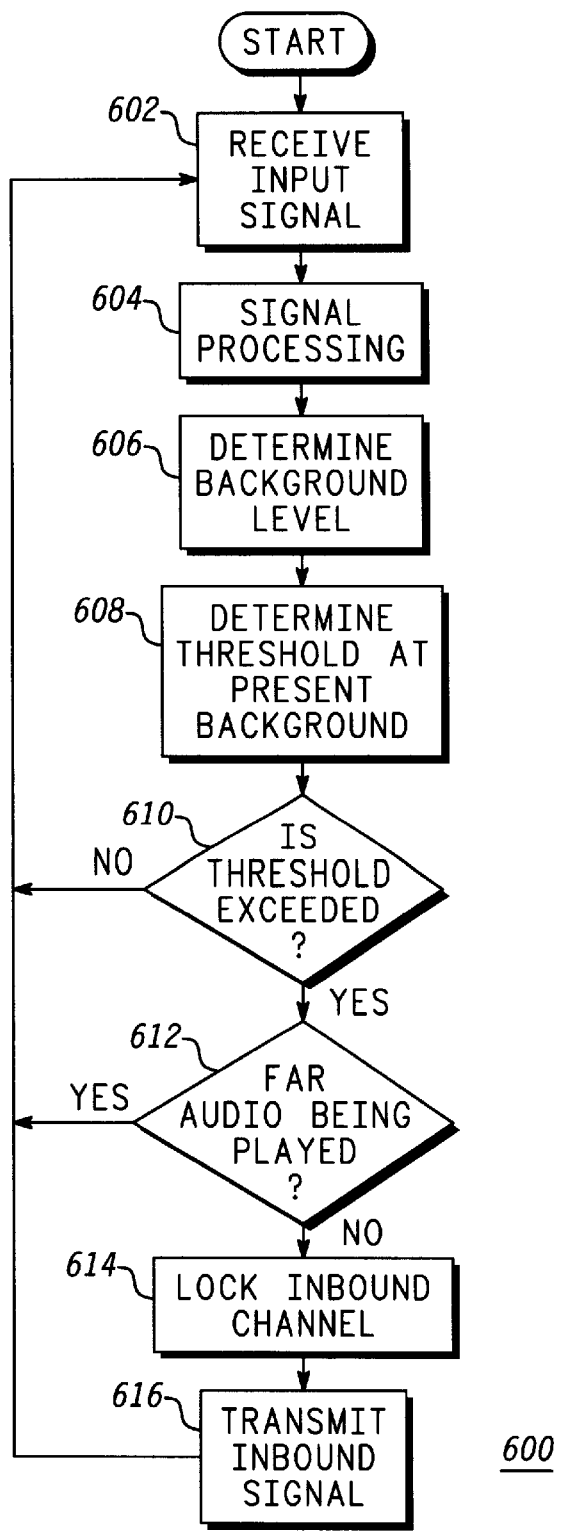
FIG. 6 shows a flow chart diagram of a method for detecting speech at a microphone of a mobile communication device operated in a speakerphone mode

Referring now to FIG. 6, there is shown a flow chart diagram 600 of a method for detecting speech at a microphone of a mobile communication device operated in a speakerphone mode. The mobile communication device also has a speaker for playing a received audio signal from a remote party. The method comprises receiving an input signal at the microphone (602), and the input signal having an input level. The mobile communication device may perform some signal processing (604), such as digitizing and filtering. The mobile communication device then commences determining the background level of the input signal (606). This can be done in a conventional manner by detecting the average lowest level, for example. The mobile communication device then commences determining a threshold value of the input level for declaring speech present at the microphone (608). There are a variety of ways to do this, such as with a look up table, or simply adding a set value to the background level. In the alternative embodiment, the mobile communication device calculates the desired difference between the input signal level and the background noise level. This may also include determining hysteresis levels. The mobile communication device then commences comparing the background level with the threshold value (610). If the threshold value is exceeded, then the mobile communication device declares speech present at the microphone when the input level exceeds the threshold value. The mobile communication device, in determining the threshold value, varies the threshold value so that it increases as the background level increases. Once speech is declared, the mobile communication device checks to see if remote audio is being played (612). Meaning the mobile communication device checks to see if it is already receiving and playing audio from the remote party. If so, then it simply returns for the next input signal segment. If remote audio is not being played, meaning the speaker is idle, or simply playing background noise, the mobile communication device locks the inbound channel (614) and begins transmitting the inbound signal (616). By locking the inbound channel, it is meant that the speaker is muted so even if remote audio is received while the inbound channel in locked, it will not be played. The inbound signal is the modulated radio frequency signal derived from the input signal.

A second embodiment of the invention includes receiving an input signal at the microphone, the input signal having an input level; determining a background level of the input signal; determining a threshold value of the difference between the input level and the background level for declaring speech present at the microphone; comparing the background level with the threshold value; declaring speech present at the microphone when the difference between the input level and the background level exceeds the threshold value; and varying the threshold value so that it decreases as the background level increases. In both embodiments the method of changing the threshold with respect to the background noise level may be done step-wise. Furthermore, hysteresis may be employed so that an upper threshold must be exceeded to declare speech present, and speech is declared until the input signal or the difference between the input signal and the background noise level falls below a lower threshold.

The invention may also be used for controlling speakerphone operation in a mobile communication device. This is accomplished by converting the near audio to an input signal; digitizing the input signal to provide a sampled input signal having an input level; determining a background level of the sampled input signal; determining a threshold value of the input level for declaring speech present at the microphone; comparing the background level with the threshold value; declaring speech present at the microphone when the input level exceeds the threshold value; determining if the speaker is active; if the speaker is not active and speech is declared, transmitting the input signal; and varying the threshold value so that it increases as the background level increases. Alternatively, if the second embodiment is preferred, then the mobile communication device would perform the steps of determining a threshold value of the difference between the input level and the background level for declaring speech present at the microphone; comparing the background level with the threshold value; declaring speech present at the microphone when the difference between the input level and the background level exceeds the threshold value.

The invention also provides a method of performing background noise adaptable speech detection in a mobile communication device operated in a speakerphone mode. The communication device begins receiving a digitized audio signal, then determines a background energy level of the digitized audio signal. Speech is declared to be present in the digitized audio signal when a threshold level is exceeded, and the threshold level is adjusted in correspondence with changes in the background energy level. The background energy level can be determined as an average energy level of an unvoiced frame of the digitized audio signal. This assumes the mobile communication device is performing an encoding process on the digitized audio signal, as is common in the art. The background energy level can also be determined by a staggered average energy level of unvoiced frames of the digitized audio signal. Speech is declared present when the difference between the background energy level and an energy level of a voiced frame of the digitized audio signal exceeds a predetermined threshold, which is adjusted with the background energy level.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. A method of performing background noise adaptable speech detection in a mobile communication device operated in a speakerphone mode, the method comprising:

receiving a digitized audio signal at the mobile communication device;

determining a background energy level of the digitized audio signal;

declaring speech present in the digitized audio signal when a threshold level is exceeded, performed by computing a difference between the background energy level and an energy level of a voiced frame of the digitized audio signal; and adjusting the threshold level in correspondence with changes in the background energy level, performed by inversely varying the difference required between the background energy level and the energy level of the voiced frame of the digitized audio signal to declare speech present.

2. A method of performing background noise adaptable speech detection in a mobile communication device operated in a speakerphone mode as defined in claim 1, wherein the determining of the background energy level is performed by determining an average energy level of an unvoiced frame of the digitized audio signal.

3. A method of performing background noise adaptable speech detection in a mobile communication device operated in a speakerphone mode as defined in claim 1, wherein the determining of the background energy level is performed by determining a staggered average energy level of unvoiced frames of the digitized audio signal.

4. A method of performing background noise adaptable speech detection in a mobile communication device operated in a speakerphone mode as defined in claim 1, wherein the varying is performed step-wise.

* * * * *